(12) United States Patent
Kelley (10) Patent No.: US 8,550,140 B2
(45) Date of Patent: Oct. 8, 2013

(54) STORM WINDOW AND PANEL ATTACHMENT

(75) Inventor: Tim Kelley, Stillwater, MN (US)

(73) Assignee: Andersen Corporation, Bayport, MN (US)

(*) Notice: Subject to any disclaimer, the term of this patent is extended or adjusted under 35 U.S.C. 154(b) by 255 days.

(21) Appl. No.: 12/872,221

(22) Filed: Aug. 31, 2010

(65) Prior Publication Data

US 2011/0047875 A1 Mar. 3, 2011

Related U.S. Application Data

(60) Provisional application No. 61/238,408, filed on Aug. 31, 2009.

(51) Int. Cl.
*E06B 3/32* (2006.01)

(52) U.S. Cl.
USPC .......... 160/90; 49/463; 52/202; 52/69; 52/599

(58) Field of Classification Search
USPC .......... 160/90; 49/463, 465, 466; 52/202, 203, 52/204.51, 204.69, 204.6, 204.599
See application file for complete search history.

(56) References Cited

U.S. PATENT DOCUMENTS

| | | | | |
|---|---|---|---|---|
| 1,780,852 A * | 11/1930 | Sullivan | ...................... | 52/204.69 |
| 1,955,648 A * | 4/1934 | Nickler | ......................... | 292/288 |
| 2,026,830 A * | 1/1936 | Everhard | ....................... | 160/369 |
| 3,137,901 A * | 6/1964 | Malachowski et al. | ......... | 52/773 |
| 3,170,507 A * | 2/1965 | Kleinknecht | ................... | 160/369 |
| 3,214,879 A * | 11/1965 | Ellingson, Jr et al. | .......... | 52/393 |
| 5,546,714 A * | 8/1996 | Kenkel | .......................... | 52/204.5 |
| 6,155,010 A * | 12/2000 | Becken et al. | ............. | 52/204.61 |
| 7,823,833 B2 * | 11/2010 | Wood | .......................... | 244/129.3 |
| 8,074,698 B2 * | 12/2011 | Allsopp | ........................ | 160/107 |
| 2011/0047875 A1 * | 3/2011 | Kelley | ............................... | 49/63 |

* cited by examiner

*Primary Examiner* — Blair M. Johnson
(74) *Attorney, Agent, or Firm* — Womble Carlyle Sandridge & Rice, LLP (57) ABSTRACT

An improved method of installing a storm window in a prime window includes application of locking clips at predetermined locations around the frame of the prime window. The storm window is positioned over the prime window and swung into place, whereupon the storm window frame snaps and is locked into place by the clips. Bulb seals around the storm window frame compress between the storm window frame and the frame of the prime window to insure a complete and reliable seal against the elements and maximize sound abatement.

29 Claims, 9 Drawing Sheets

STORM WINDOW AND PANEL ATTACHMENT

REFERENCE TO RELATED APPLICATION

Priority is hereby claimed to the filing date of U.S. provisional application 61/238,408 filed Aug. 31, 2009.

TECHNICAL FIELD

This disclosure relates generally to fenestration and more particularly to storm windows and their attachment to a prime window.

BACKGROUND

Storm windows are auxiliary windows that traditionally are attached over the outside of a main or prime window to provide additional insulation, resistance to storms and blowing rain, and increased sound abatement. A popular type of storm window is sometimes called the combination storm window. Combination storm windows commonly combine glass panels or glazing units and at least one insect screen. One or more of the glass panels can be raised and/or lowered or otherwise arranged to allow ventilation through the storm window and insect screen and can be closed to form a barrier or insulation against the outside environment. A combination storm window generally has a frame sized to be fitted within the frame or over the exterior trim of the prime window and this frame surrounds and supports the glass panels and insect screen of the storm window. Combination storm windows generally are attached to a prime window frame or its exterior trim using fasteners such as screws, and sealants such as silicone caulk. A typical combination storm window is disclosed in U.S. Pat. No. 4,274,468.

Combination storm windows are advantageous in that they are adaptable to changes in weather conditions simply by sliding their glass panels to different positions to provide ventilation or insulation as desired. The performance of traditional combination storm windows with single layer glass panes can be limited, however, particularly in situations where noise abatement is also desired. Noise abatement of a storm window can be significantly enhanced by using double glazed glass panels, which are becoming more common. However, this adds substantially to the weight of the glass panels, making them difficult to slide into different positions thus reducing the ease and convenience of the storm window. For this and other reasons, it has been found that in instances where noise abatement is a primary goal, it is useful to use one large single or double glazed glass panel sealed within a storm window frame and that covers the entire window opening. Storm windows with such panels, while effective, can be quite heavy and difficult or cumbersome to install.

For these and other reasons, a need exists for an improved method and associated apparatus for installing storm windows, and particularly heavy storm windows, over prime windows that addresses the above and other shortcomings of traditional installation techniques. It is to the provision of such a method and apparatus that the present invention is primarily directed.

SUMMARY

The entire contents of U.S. provisional patent application 61/238,408, to which priority is claimed above, is hereby incorporated by reference.

An improved method and apparatus for attaching a storm window to a prime window includes mounting clips at predetermined locations around the frame of the prime window. The storm window frame is configured to be snapped onto the clips in various alternative ways and the clips lock the storm window in place. Bulb seals or other flexible or resilient seals are provided between the interior frame surfaces of the storm window and exterior surfaces of the prime window to provide a complete and reliable seal between the storm window frame and the prime window frame or surrounding trim. The installation method includes moving one side of the storm window frame into the prime window frame and rotating the storm window into the prime window until the clips snap the storm window securely in place. The method is quick, attractive, more reliable, less subject to the skill of the installer, and provides a substantially complete seal that effectively blocks water, air, and provides significantly enhanced sound abatement. These and other features, aspects, and advantages will become apparent to those of skill in the art upon review of the detailed description set forth below, taken in conjunction with the accompanying drawing Figs., which are briefly described as follows.

DETAILED DESCRIPTION

Figure 1:
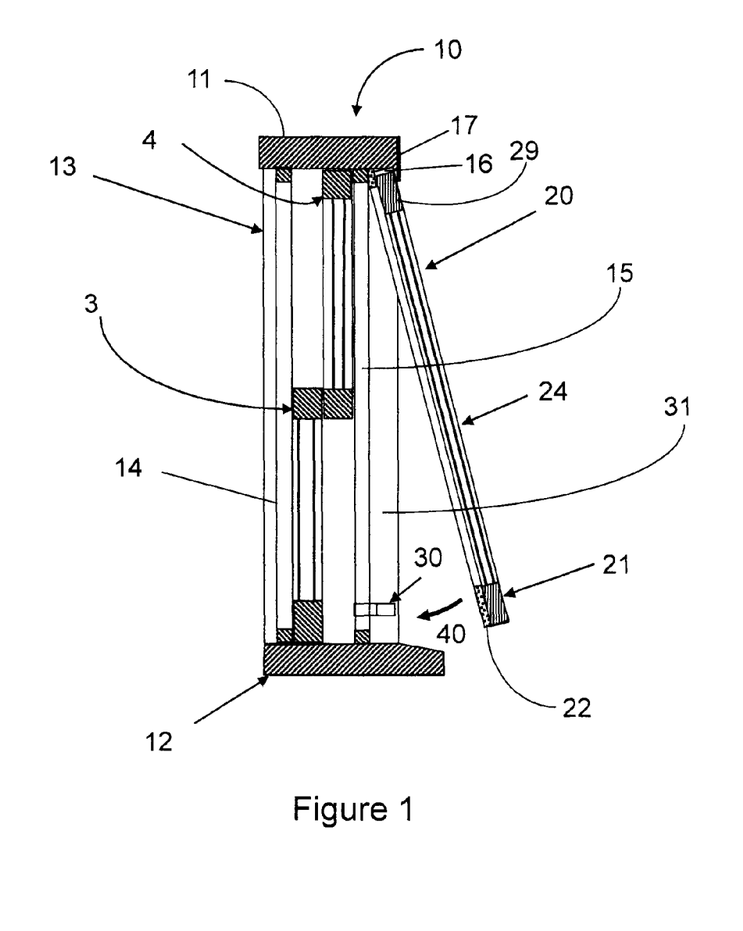
FIG. 1 is a side elevational cross section of a prime window and a storm window that embodies principles of the invention in one preferred form.

Reference will now be made to the annexed drawing Figures, wherein like reference numerals refer, where appropriate, to like parts throughout the several views. Generally, the storm window attachment system of this disclosure uses installation clips for attaching a storm window or storm panel to a traditional prime window. FIG. 1 shows, in cross section, a prime window 10, along with a storm window 20. Prime window 10 is made up top member or head jamb 11, side members or side jambs 13, and bottom member or sill 12. Together the side jambs, head jamb, and sill form a rectangular frame that holds window panels or frames 3 and 4. In a typical prime window, panels 3 and 4 are vertically slidable in jamb liner tracks to allow opening for ventilation. It will be recognized that this need not be the case, and that only one of the panels, typically lower panel 3, may open for ventilation. It will further be recognized that in place of panels 3 and 4, a single panel may be provided, as is the case with picture windows. Prime window 10 is further provided with interior jamb stops 14 and exterior jamb stops 15, which hold sashes 3 and 4 in place, and also aids in sealing the window against air penetration. Exterior jamb stop 15, in combination with similar projecting surfaces along head jamb 11, side jambs 13, and, in some windows, sill 12, define a pocket that traditionally receives an insect screen but that also can receive a storm window.

Storm window 20 is configured with a rectangular frame 21 that surrounds and holds a glazing unit 24, which may be a dual pane glazing unit or a single pane glazing unit, an openable glazing unit, or a sealed fixed glazing unit. In cases wherein storm window 20 is intended to reduce noise penetration, dual panes may be of different thicknesses, as this has been found to reduce sound transmission. In addition, one or both of the glass panes may comprise laminated glass, wherein two sheets of glass are laminated together with a sheet of polymeric material such as PVB between them, to provide enhanced sound damping. A seal between the frame of the storm window 20 and the prime window 10 may be provided by a resilient gasket 22, which can be a traditional foam gasket, a bulb seal, flexible fins, or any other material and configuration that forms an adequate seal. The gasket 22 typically is attached to the frame of the storm window 20 and seals against exterior jamb stop 15 of the prime window. In other embodiments, however, gasket 22 may be attached to jamb stop 15 or to the prime window frame, to seal against storm window 20, or gasket sections may be attached both to the storm window and the jamb.

Attachment clips 30, one of which is illustrated in FIG. 1, are mounted to the prime window frame, in this case the side jamb 13, and the clips are adapted to receive and secure the frame of the storm window 20 during installation, as described in detail below. Generally, in one embodiment the top of the storm window frame is moved into place against the head jamb of the prime window and the bottom of the storm window is pivoted inwardly as indicated by arrow 40 until the clips 30 engage and capture the storm window frame to secure the storm window in place with gasket 22 compressed between the storm window frame and the exterior stop of the prime window to form a seal.

As mentioned, additional or multi-layer glass panes when used for sound abatement and reduction of heat transmission can add significant weight to storm window 20, thus adding to the difficulty and danger of handling the window during installation and removal. The storm window and installation system disclosed herein, illustrated simply in FIG. 1 for clarity, permits easier installation of the storm window by allowing the installer to hold the storm window in a more stable position during installation. More specifically, and with reference to FIG. 2, storm window 20 can be installed by first placing the top edge 23 of the storm window frame against jamb stop 15 (and the opposite jamb stop) as indicated by the angled-most phantom outline in FIG. 2. The bottom of storm window 20 can then be pushed inwardly toward the prime window in direction 26 while at the same time pushing it generally upward in direction 27. The upward pushing and inward tilting of storm window 20 toward the vertical is continued, as indicated by the next phantom outline in FIG. 2, until top rail 29 of the storm window frame 21 engages a channel 16 at the along the head jamb of prime window 10.

Figure 2:
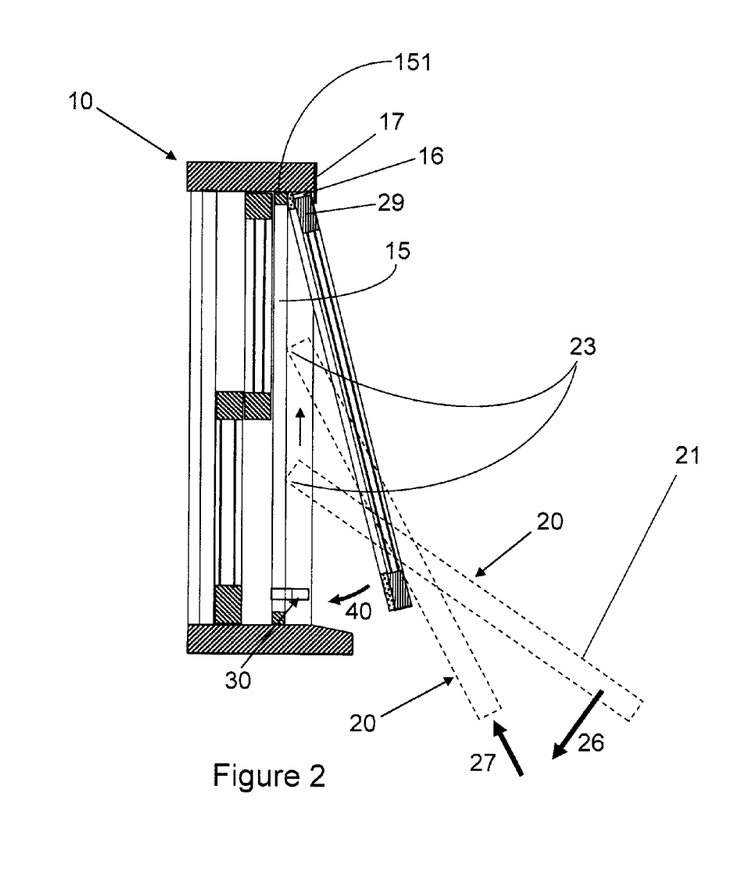
FIG. 2 illustrates a sequence of steps that can be applied to install a storm window according to an embodiment of the invention.

Channel 16 may be defined between the top portion 151 of the exterior jamb stop 15 and a downwardly depending lip 17 along the outer periphery of the prime window frame. The lip 17 may be part or an extension of a drip edge or exterior trim, or may simply be a strip of a suitable material such as aluminum or plastic that has been attached to prime window 10. In any event, the channel 16 is sized to receive the top rail 29 of the storm window frame 21 when the storm window is slid upwardly as shown to capture the top rail 29.

With the top edge of the storm window in place in the channel at the top of the prime window, the bottom edge of storm window 20 can be pivoted inwardly in direction 40 until storm window 20 moves toward a substantially vertical orientation. Just before becoming fully received in the frame of the prime window, the storm window frame engages installation clip 30 according to the disclosure. Installation clip 30 has previously been mounted to the jamb stop 15 (and a like clip has been attached to the opposite jamb stop). The clip 30 includes a springable leg that projects into the pocket of the prime window frame and a projection in the form of a tang 31 that snaps into a receiving portion of storm window frame to hold the storm window in its installed position.

With storm window 20 secured by clips 30 in its installed position, resilient gasket 22 becomes compressed against jamb stop 15 to form a reliable seal between the storm window frame and the prime window. The compressed gasket 22 also urges the frame of the storm window 20 outward against lip 17 at the head jamb and against the tangs 31 of installation clips 30 located adjacent the sill. Accordingly, the storm window frame becomes wedged between the jamb stop 15, the top lip 17, and the clips 30 on the side jambs of the prime window. It will be appreciated that while FIGS. 1 and 2 show only one installation clip 30, a preferred embodiment includes at least two such clips, one on each side jamb of the prime window opposite one another. More than two clips 30 also can be used depending on the size and weight of the window and other application specific factors. In any event, the storm window 20 becomes securely and sealingly locked in place within the prime window by simply rotating it into position and pressing it into the pocket of the prime window against the resiliency of the gasket 22.

Figure 3:
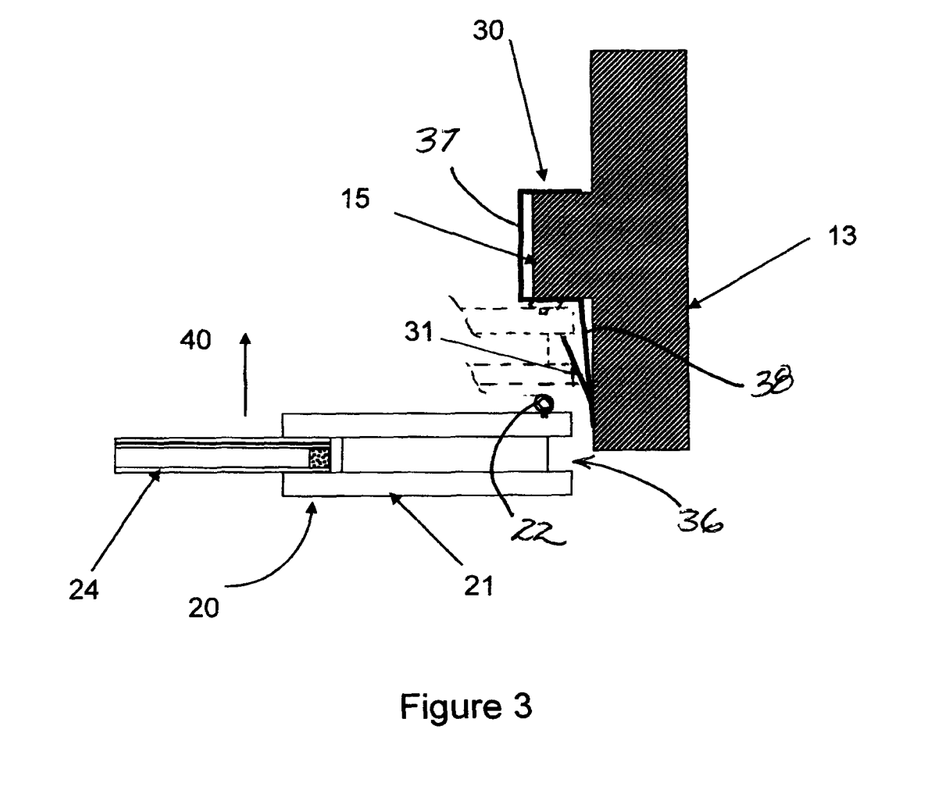
FIG. 3 is a cross sectional view of a prime window jamb to which an attachment clip according to an embodiment of the invention is mounted.

FIG. 3 illustrates more clearly one possible configuration of the clip 30, and the interaction of its tang 31 with the receiving portion 36 of a storm window frame 21 as the storm window 20 is pressed into its final installed position, which is illustrated in phantom lines in FIG. 3. The clip 30 has U-shaped mounting portion 37 that is sized to fit onto the exterior jamb stop 15 of the prime window frame to mount the clip to the frame. A leg 38 projects outwardly from the mounting portion 37 adjacent the interior wall of the side jamb 13 and, because of the resiliency of the material from which the clip is made, the inner portion of the leg 38 is spring biased slightly away from the wall. A projection, in the form of a tang 31 in this embodiment, projects at an angle from the leg 38 of the clip generally toward the interior of the window.

As the storm window 20 moves toward the exterior jamb stop 15 during installation, the outer edge of the storm window frame engages and begins to slide along the tang 31, which begins to depress or spring the leg 38 toward the interior wall of the side jamb 13. Subsequently, the gasket 22, which in FIG. 3 is a bulb seal, engages the jamb stop 15 of the prime window frame. Further inward pressure on the storm window compresses the gasket 22 until the tang 31 snaps into the receiving portion 36, in this case a slot, formed along the edge of the storm window frame. The outward pressure imparted by the compressed gasket 22 causes the inside wall of the receiving portion 36 to be pressed slightly outwardly and tightly against the end of the tang 31, thus holding the tang securely in place within the receiving portion and maintaining the compression of the gasket 22. A groove or other feature may be formed along the inside wall of the receiving portion 36 for engaging affirmatively with the end of the tang and preventing it from moving out of the receiving portion 36 absent inward pressure being applied to the storm window.

In the event that it becomes necessary to remove storm window 20 from the prime window, clips 30 can be released by progressively inserting a putty knife or similar thin tool into the space between the frame of the storm window 20 and the clip 30. Inward pressure can be applied to the storm window at the same time against the force of the compressed gasket 22 to disengage the end of the tang from the inner wall of the receiving portion 36 of the storm window frame. The inwardly moving tool engages the tang 31 of the clip 30 and progressively moves it out of the receiving portion 36 of the storm window frame. The resiliency of gasket 22, when the window is released, urges the storm window outward a slight distance beyond the tang 31. This prevents reengagement of the tang 31 with the receiving portion 36 when the tool is extracted. The same procedure can be performed at the locations of other clips until all clips are all released. The storm window can then simply be pivoted out of the prime window and lowered away in a simple and easily manageable process.

The attachment system of this disclosure can also be configured for use with prime windows of configurations other than those shown in FIGS. 1 through 3. For example, a popular method of producing window frames is to extrude a metal or thermoplastic material into lineal stock having a suitable cross sectional profile for a window frame. The stock is then cut into suitable lengths and assembled into window frames in known ways. Frames made in this manner typically include, as part of the extrusion profile, an inward extending tab or stop that, together with the adjacent wall of the lineal, defines a pocket within which an insect screen can reside if installed. By removing the insect screen, this pocket may receive the frame of a storm window panel that can be installed generally as described above and fastened with a clip according to an alternate embodiment of the invention.

Figure 4:
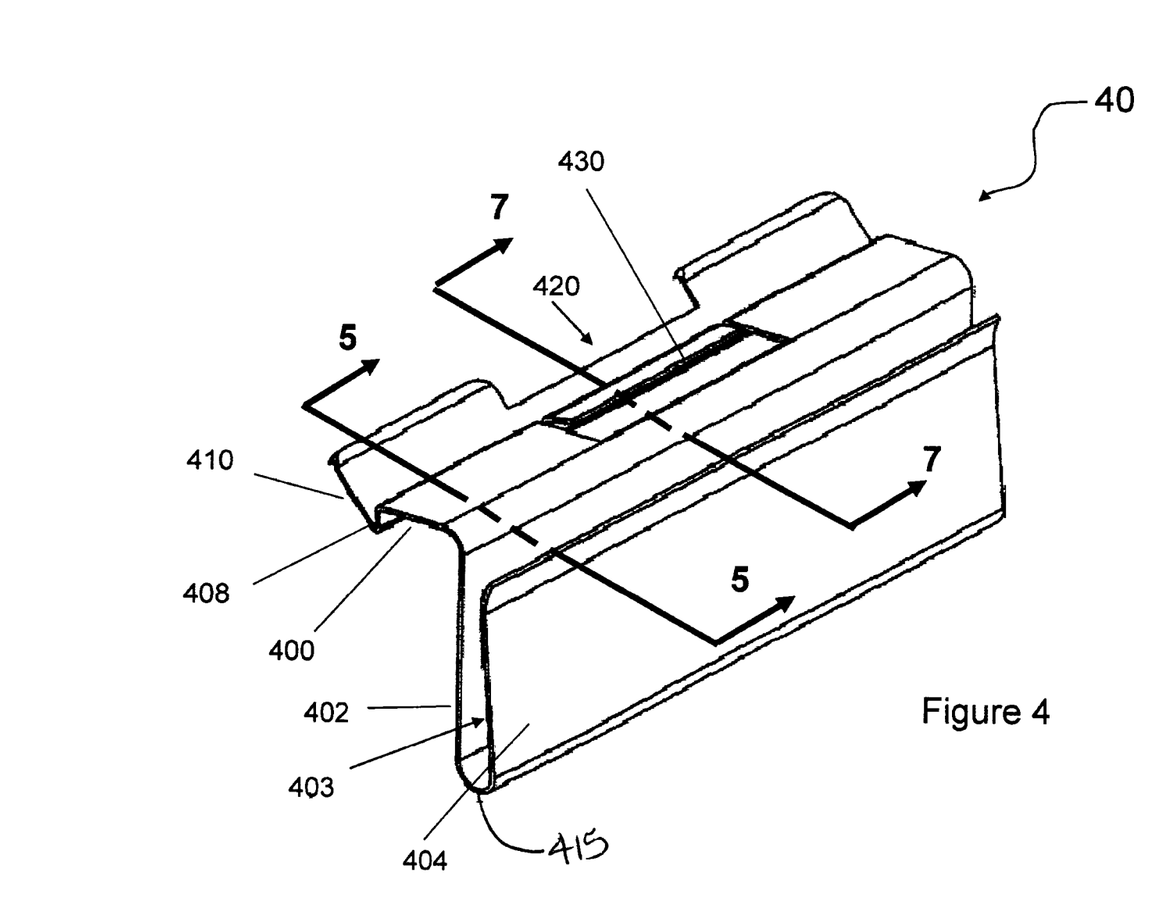
FIG. 4 is a perspective view of an attachment clip according to a second embodiment of the invention.
Figure 5:
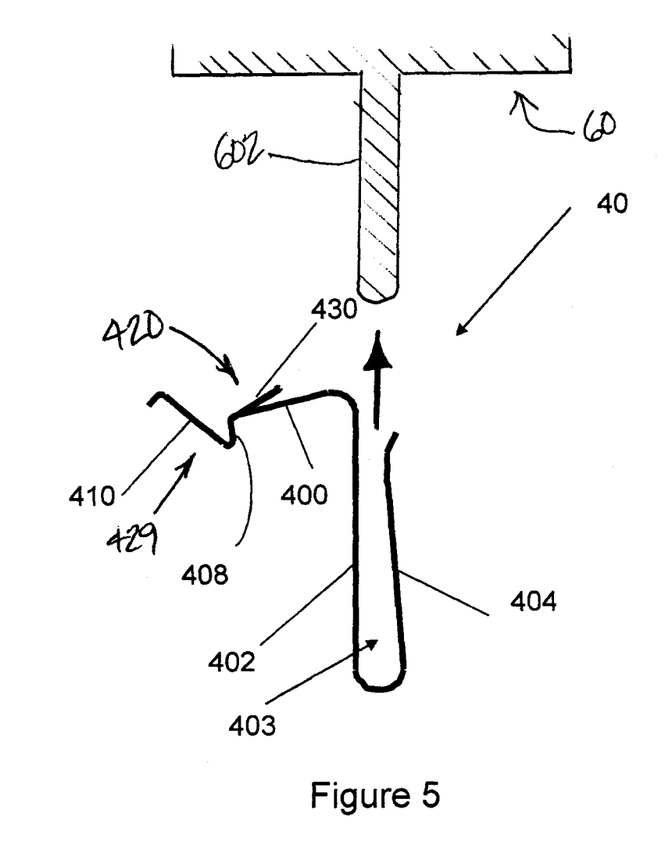
FIG. 5 is a cross sectional view of the clip of FIG. 4 taken along line 5-5.

An installation clip adapted for use with prime windows of this sort is illustrated in FIG. 4. Clip 40 comprises base portion 400 from which a narrow U-shaped tab engaging section extends. The tab engaging section is formed with a first tab engagement wall 402 and a second tab engagement wall 404 connected together by a bight portion 415. Tab engagement walls 402 and 404 define between them a tab engagement channel 403. The tab engagement channel 403 is sized to fit or be clipped onto the tab of the aforementioned extruded window lineals to secure the clip 430 onto the lineals for installing a storm window panel generally as described above. More specifically, FIG. 5 shows a cross sectional profile of a section of clip 40 being mounted onto tab 602 of an extruded lineal 60. The channel 403 is sized to be pressed onto tab 602 to mount and secure the clip to the tab. When the clip is fully moved onto the tab 602, the base 420 of the clip projects outwardly from the tab and is fabricated to form a latch 429 having a lead-in ramp 410 and a hook 408. Due to the resiliency of the material, preferably metal, from which the clip is made, the leg 400 yieldably spring biases the latch 429 toward the inside of the window. A shim tang 430 projects in the opposite direction from the latch toward the lineal 60 for engaging with a shim to lock the latch 429 to a storm window frame as described in more detail below.

Figure 6:
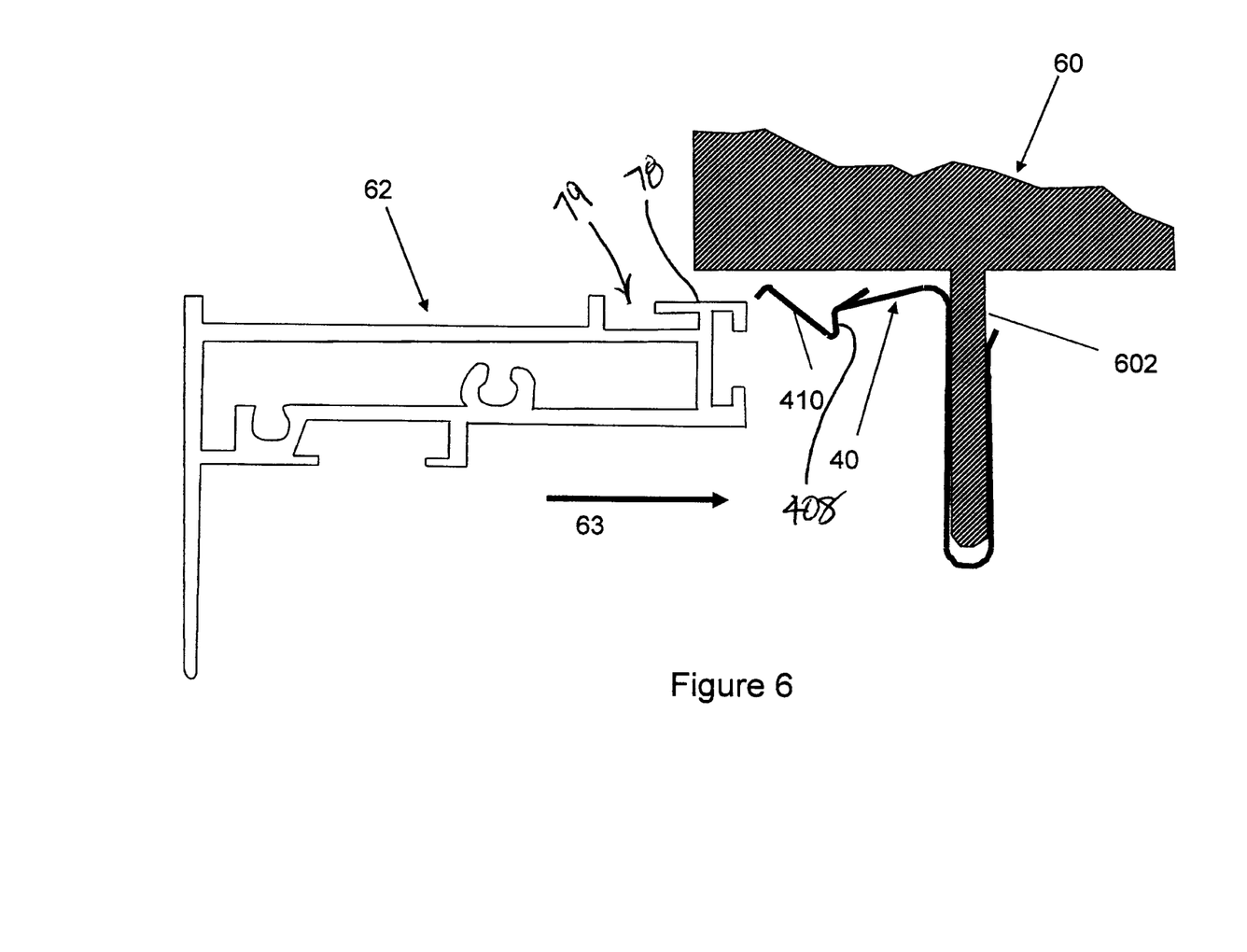
FIG. 6 is a cross sectional view of a window jamb with the clip embodiment of FIG. 4 attached thereto and with the frame of a storm window moving into engagement with the clip.

FIG. 6 shows clip 40 installed on screen stop tab 602 of an extruded lineal of window frame 60. A portion 62 of a storm window frame is shown being moved toward into the pocket of the prime window frame toward the clip 40. It will be understood that FIG. 6 depicts the bottom portion of a side rail of the storm window frame and that the storm window has been raised up into engagement with the head jamb of the prime window as described above and its bottom portion is being pushed inwardly into the pocket for attachment in direction 63.

The storm window frame 62 is formed with an attachment slot 79 at the end of a flat ramp 78 as shown. It will be seen from FIG. 6 that as the storm window frame moves toward the prime window, the lead-in ramp 410 of the latch is engaged by the flat ramp 78. Further movement of the storm window frame progressively depresses the latch against the bias of the resilient leg toward the prime window frame as the flat ramp 78 moves past the latch of the clip. When the trailing end of the flat ramp 78 reaches the hook 408 of the latch, the latch snaps into the attachment slot 79 with the hook portion 408 of the latch resting against the trailing edge of the flat ramp 78. In this way, the storm window snaps into place within the prime window in the position generally shown in FIG. 7. A bulb seal or other gasket (not shown) is generally disposed in the gasket slot 77 and is compressed against the tab 602 thereby forming a seal. As with the prior embodiment, the outward force generated by the compressed gasket bears against the hook 408 of the latch tending to hold the latch more firmly in place.

Figure 7:
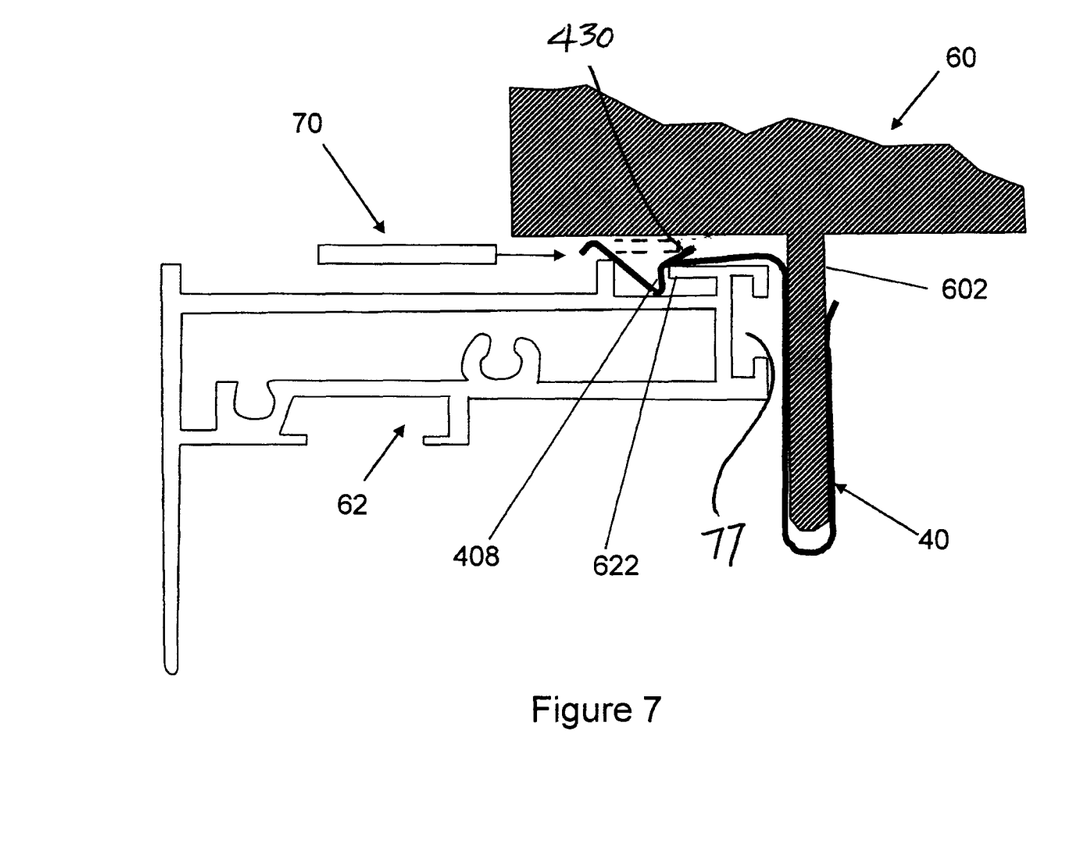
FIG. 7 is a cross sectional view the clip of FIG. 4 taken along line 7-7 thereof and with the clip attached to a prime window jamb securing the frame of a storm window to the prime window with a shim according to the invention being inserted.
Figure 8:
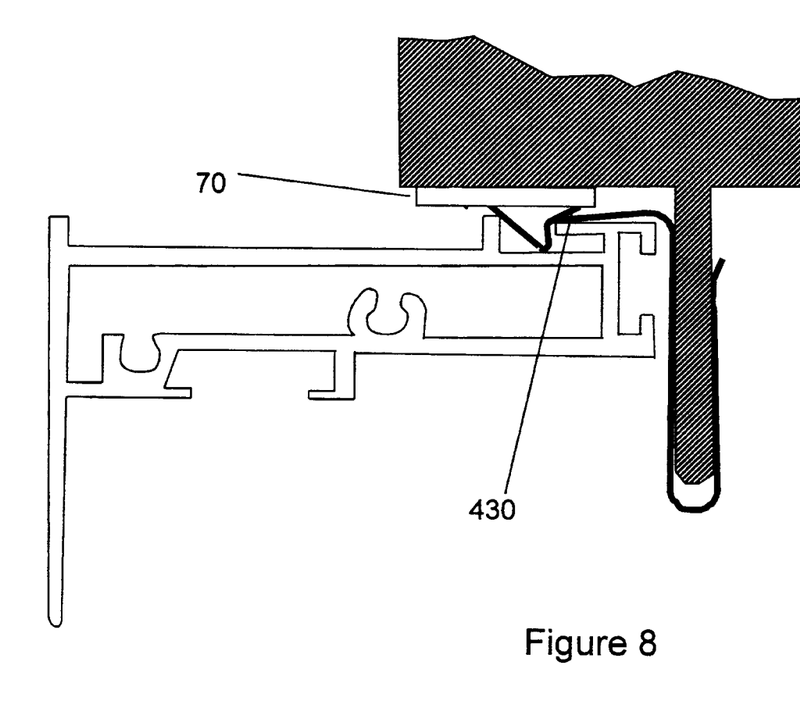
FIG. 8 is the view from FIG. 7 with the shim completely inserted securing the clip and storm window in place.

While making clip 40 from a material having a relatively high elastic modulus may, in many cases, hold the frame 62 of the storm window in engagement with window frame 60, there may be cases wherein it is useful to lock hook portion 408 in more secure engagement with engagement portion 79. This can be achieved according to one embodiment of the invention by use of a shim 70 as illustrated in FIGS. 7 and 8. For this purpose a notch 420 (FIG. 4) is formed in the base 400 of the clip 40 and the notch has a width predetermined to accommodate passage of a shim 70. As shown in FIG. 7, a locking shim 70 can be inserted as indicated by the arrow through the slot 420 in the clip 40. As the shim 70 progresses, it eventually engages the shim tang 430 of the clip, as illustrated in phantom lines in FIG. 7. Further pressing in of the shim 70 wedges the shim between the window lineal 60 and the shim tang 430 as illustrated in FIG. 8. The latch of the clip is this locked to the frame of the storm window preventing it from removal.

The shape of the shim tang 430 prevents the shim from being pulled back out, and thus locks the storm window securely in place within the prime window and also serves as a security measure against would-be thieves who might otherwise attempt to remove the storm window for access. The material from which the shim 70 is made can be any material with sufficient strength and longevity to perform the functions of the shim. For example, wood or aluminum might be used to fabricate the shim 70, although polymeric materials such as PVC or ABS plastics have been found useful as well.

The material from which the clip 40 is fabricated likewise may be any material that provides the strength and resiliency required for holding the storm window in place. A useful material for the clip 70 (and the clip 30 of the prior embodiment) is AISI 301 half hard stainless steel having a thickness of about 0.014 inches. While other metals may also be used, stainless steel is especially suitable in that it resists corrosion and is less likely to produce rust stains on the exterior of the window frame. Stainless steel also has an inherent spring constant that has been shown to be appropriate for the present invention.

Figure 9:
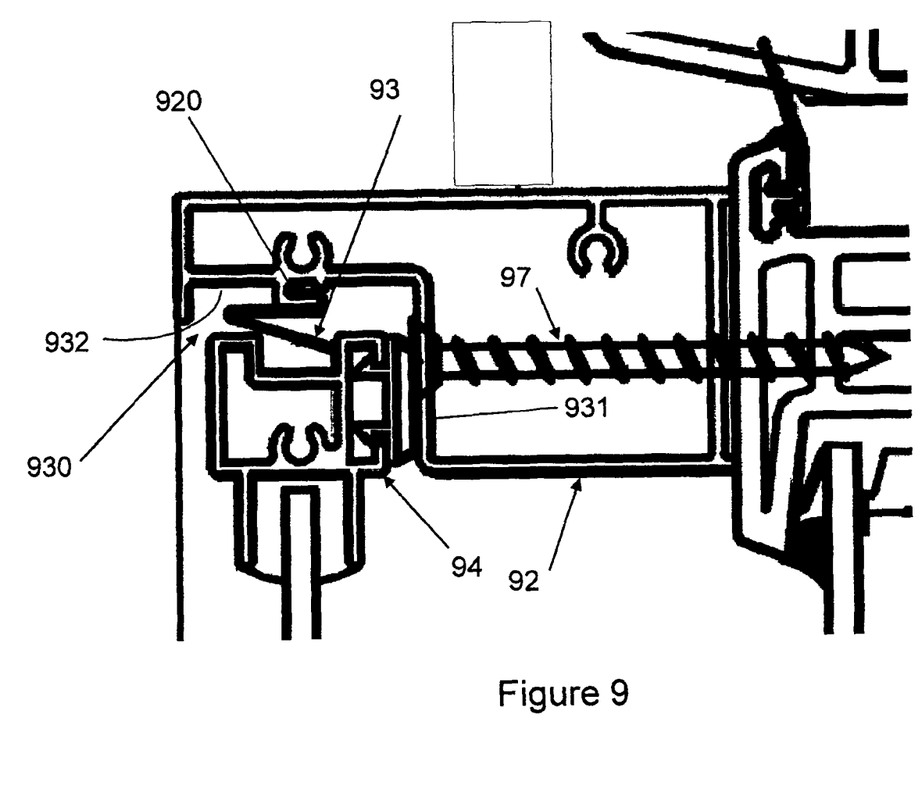
FIG. 9 is a cross sectional view illustrating a sub-frame attached to a prime window and a storm window attached to the sub-frame using an alternate embodiment of the invention.

Some window styles, such as casement windows, may not incorporate screen stops or other features for defining a pocket for receiving a storm window. In such cases, adaptor frames, or sub-frames, may be used. FIG. 9 shows one such solution in the form of a partial view of a sub-frame 92 attached to a frame 90 of a casement window, also shown in partial view. Stop portion 931 and wall portion 932 of the sub-frame define a panel receiving pocket 930. Partially shown storm window frame 94 is installed in panel receiving pocket 930 of sub-frame 92 and held in place with one or more clips 93 according to the invention. Clips 93 are anchored to sub-frame 92 by a frictional fit within slot 920. Clips 93 may further be adapted to receive a shim, in the manner portrayed in the embodiment of FIG. 4

It is contemplated that sub-frame 92 may incorporate an edge receiving channel at the top of the window frame to receive the top edge of a storm window panel, prior to bringing the panel into engagement with clips 93. In alternative embodiments, it may be useful to locate a channel for initially receiving the bottom edge of a storm window panel at the bottom of the sub-frame, so as to support the storm window panel as it is being tilted upwardly into place and into engagement with clips near the top of the sub-frame. While such an installation is the opposite of that discussed with respect to prior embodiments, the principles are the same except that the weight of the storm window panel is supported by the sill of the prime window during installation. This embodiment may be particularly useful for noise abatement applications, in which the storm window panels can be significantly heavier than simple storm windows.

An alternate embodiment of the method and apparatus of this invention uses clips on the top or head jamb of the prime window instead of along the side jambs as described above. In this embodiment, the top rail of the storm window frame itself has a groove to receive projections of the clips to hold the top of the storm window in place as the storm window is rotated into the prime window. For this alternate embodiment the top rail of the storm window frame is attached to the prime window in a similar manner as the sides of the storm window in prior embodiments, i.e. by being positioned onto the clips. A similar approach can also be used for first attaching the storm window along the bottom or frame of the window and then moving the top of the storm window into engagement with the clips at upper portions of the prime window.

The method and apparatus of this disclosure have been described above within the context of preferred embodiments and methodologies considered by the inventors to represent the best modes of carrying out the invention. It will be apparent to those of skill in the art, however, that a wide variety of modifications, additions, and deletions might well be made to the illustrated embodiments within the scope of the invention. For example, the flexible seal has been described primarily as a bulb seal attached to the storm window frame or to the prime window frame. This seal can, however, take on a variety of other configurations and need not be pre-attached to either the storm window or the prime window. Further, the particular configurations of the clips shown and described is not limiting and any clip configuration that effectively mounts to a prime window frame and receives and locks the storm window in place might be substituted to obtain the same result in substantially the same way. The materials from which the various components are fabricated might include aluminum, spring steal, plastic, PVC, or any other material suitable to the goals of the disclosure. The storm window is illustrated and described herein as being mounted on the exterior side of the prime window. This is not a limitation of the invention, however, and the storm window or another type of panel might just as well be mounted on the interior side of the prime window according to the methodology of the disclosure.

These and other revisions and additions might be made by skilled artisans without departing from the spirit and scope of the invention, which is delineated only by the claims.

What is claimed is:

1. A prime window and storm window combination comprising:
   a prime window having a window frame defined by side jambs, a head jamb, a sill, and a plurality of inwardly projecting tabs, the plurality of inwardly projecting tabs together with at least the side and head jambs defining a peripheral pocket, the frame of the prime window further defining a channel;
   a storm window having a frame formed of top and bottom rails and left and right stiles, the frame supporting a glazing unit;
   the frame of the storm window being at least partially disposed in the pocket defined by the plurality of inwardly projecting tabs and being configured to define an attachment feature, and with at least a portion of the frame of the storm window being disposed within the channel;
   at least one clip mounted around one of the plurality of inwardly projecting tabs;
   the at least one clip having a projection removably disposed within the attachment feature of the frame of the storm window to hold the storm window in place within the pocket.

2. The combination of claim 1 and further comprising a gasket disposed between the frame of the storm window and the frame of the prime window.

3. The combination of claim 2 and wherein the gasket comprises a compressible material.

4. The combination of claim 3 and wherein the gasket comprises a bulb seal.

5. The combination of claim 1 and wherein the channel is formed along the head jamb of the prime window and wherein the top rail of the frame of the storm window is disposed in the channel.

6. The combination of claim 5 and wherein the at least one clip comprises a pair of clips each secured to an inwardly projecting tab extending from a respective side jamb of the prime window frame.

7. The combination of claim 6 and wherein the clips are secured to the inwardly-projecting tabs adjacent the sill of the prime window frame.

8. The combination of claim 1 and wherein the clip is made of a resilient material that urges the projection of the clip into engagement with the attachment feature of the frame of the storm window.

9. The combination of claim 8 and wherein the clip is made of metal.

10. The combination of claim 9 and wherein the clip is made of stainless steel.

11. The combination of claim 1 and wherein the attachment feature of the frame comprises a groove formed at least partially around a periphery of the frame.

12. The combination of claim 11 and wherein the projection of the clip comprises a tang formed on the clip, the tang extending into the groove.

13. The combination of claim 11 and wherein the projection comprises a latch formed on the clip, the latch extending into the groove.

14. The combination of claim 1 and wherein the glazing unit comprises at least one movable glazing unit for opening the storm window for ventilation.

15. The combination of claim 14 and further comprising an insect screen on the storm window overlying at least the movable glazing unit.

16. The combination of claim 1 and wherein the plurality of inwardly projecting tabs further comprises a plurality of jamb stops and wherein the clip is secured to at least one of the jamb stops of the prime window.

17. The combination of claim 1 and wherein the clip includes a U-shaped mounted portion that is secured around the inwardly projecting tab of the prime window.

18. The combination of claim 1 and wherein the storm window is disposed on an exterior side of the prime window.

19. A method of installing a storm window having a frame onto a prime window having a frame, the frame of the storm window being defined by top and bottom rails and left and right stiles and the frame of the prime window being defined by side jambs, a head jamb, a sill, and at least one inwardly projecting tab, the method comprising the steps of:
(a) securing at least one clip to the at least one inwardly-projecting tab of the frame of the prime window;
(b) locating a rail or a stile of the frame of the storm window in the frame of the prime window at a side jamb, the head jamb, or the sill to which the at least one clip is not secured;
(c) rotating the storm window progressively into the frame of the prime window until the frame of the storm window engages the clip; and
(d) urging the storm window into the frame of the prime window until the clip attaches to the frame of the storm window to hold the storm window in place in the prime window.

20. The method of claim 19 and wherein the at least one inwardly projecting tab of the frame further comprises a jamb stop and wherein step (a) comprises securing the clip to the jamb stop.

21. The method of claim 19 and wherein step (a) comprises securing two clips to the frame of the prime window with one clip being secured to an inwardly projecting tab extending from one side jamb and the other clip being secured to an inwardly projecting tab extending from the opposite side jamb.

22. The method of claim 21 and wherein the clips are secured to the inwardly projecting tabs adjacent the sill of the prime window.

23. The method of claim 22 and wherein step (b) comprises locating the top stile of the storm window frame at the head jamb of the prime window.

24. The method of claim 23 and wherein step (c) comprises rotating the storm window about the top stile of its frame.

25. The method of claim 19 and further comprising the step of disposing a gasket between the frame of the storm window and the frame of the prime window to form a seal in step (d).

26. A storm window attachment system comprising:
a prime window having a frame with a wall and a plurality of inwardly-projecting tabs that together define a panel receiving pocket of the frame, the frame of the prime window further including a channel formed along one side of the panel receiving pocket for receiving and securing one edge of the storm window;
a storm window panel having a frame formed with a peripheral clip receiving feature;
a springable clip having a mounting portion configured to mount the clip to the plurality of inwardly-projecting tabs and a spring biased leg projecting from the mounting portion into the pocket adjacent the wall thereof; and
a projection formed on the leg of the clip configured to engage with the clip receiving feature of the storm window panel when the panel is moved into the pocket of the prime window.

27. The system according to claim 26 further comprising a shim receiving slot formed in the leg of the clip configured to allow passage of a shim between the leg and the wall of the prime window frame to lock the projection in the attachment feature when the storm window is disposed in the prime window frame.

28. The system according claim 27 and further comprising a shim configured to be inserted through the shim receiving slot.

29. The system according to claim 26 and further comprising a sub-frame attached to the prime window for adapting the configuration of the prime window to the configuration of the storm window panel.

* * * * *